United States Patent [19]
Verge
[11] Patent Number: 4,965,928
[45] Date of Patent: Oct. 30, 1990

[54] TERMINAL ASSEMBLING TOOL FOR CONNECTING MULTIPLE TERMINATED WIRES TO A CONNECTOR

[75] Inventor: Ramon M. V. Verge, Valls, Spain
[73] Assignee: Mecanismos Auxiliares Industriales, S.A., Valls, Spain

[21] Appl. No.: 395,372
[22] Filed: Aug. 17, 1989
[51] Int. Cl.[5] .............................................. B23P 19/00
[52] U.S. Cl. ....................................... 29/742; 29/747; 29/868; 29/872; 29/755
[58] Field of Search ................. 29/749, 857, 742, 747, 29/754, 760, 868, 872, 755

[56] References Cited

U.S. PATENT DOCUMENTS 2,281,478 4/1942 Chirelstein ............................ 29/749
4,308,657 1/1982 Anderton ............................ 29/749
4,399,608 8/1983 Ingaglio ............................ 29/747
4,557,045 12/1985 Serrano ............................ 29/742
4,604,795 8/1986 Collier et al. ............................ 29/857
4,680,841 7/1987 Schneider et al. ............................ 29/749
4,720,275 1/1988 Swart et al. ............................ 29/857

*Primary Examiner*—P. W Echols

[57] ABSTRACT

A terminal assembling tool connects multiple terminated wire with a common bus connector. The tool includes first and second jigs which pre-position the wires and the connector and are movable between a load/unload position and a connecting position. The jig for the connector includes a retainer member which interacts with the connector to assist in removing the terminated wires from the other jig following connection.

7 Claims, 9 Drawing Sheets

FIG.5
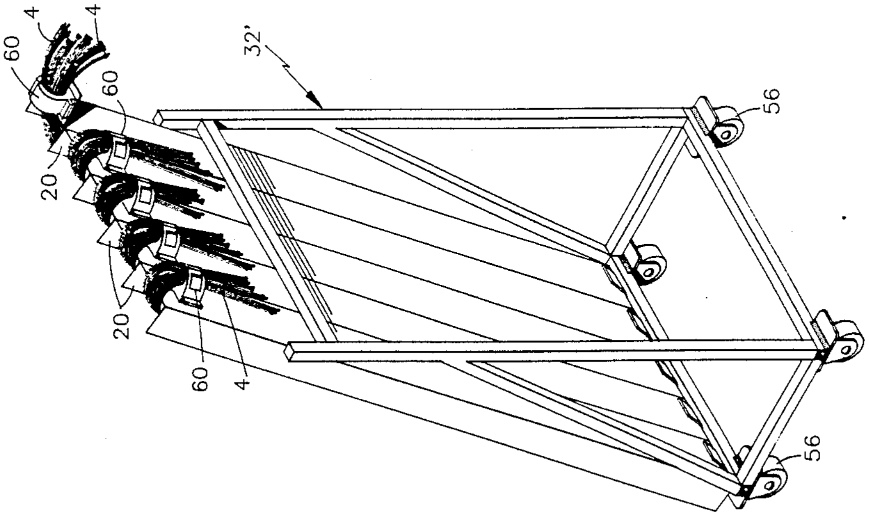
FIG.4
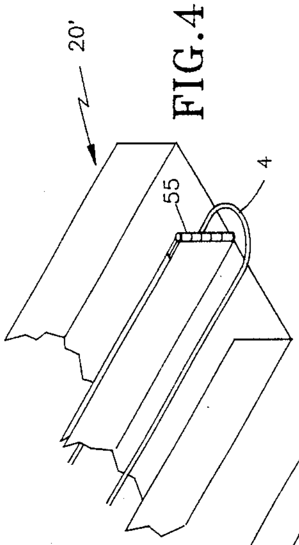
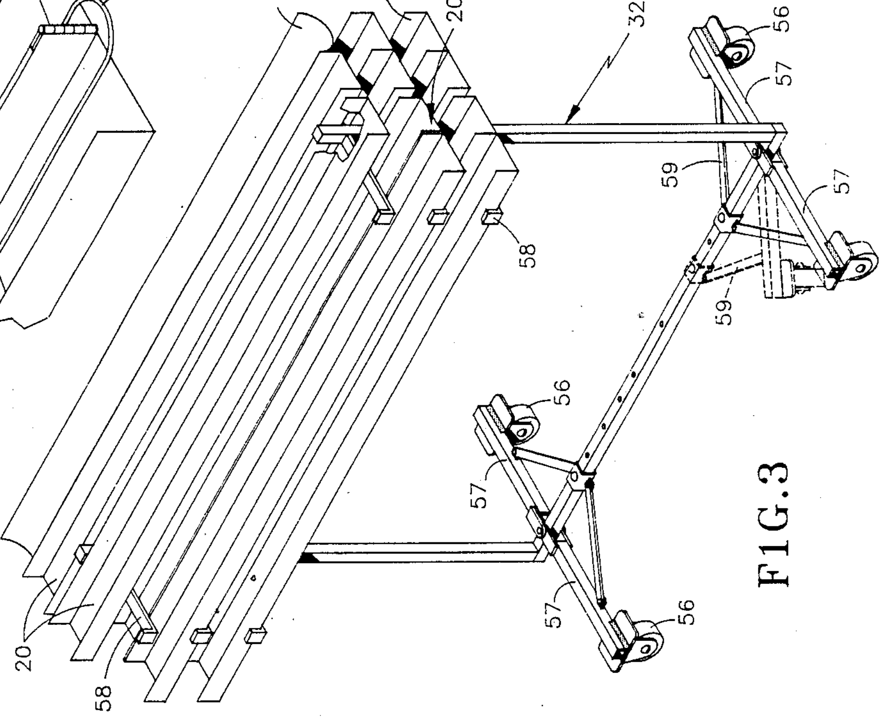
F1G.3

TERMINAL ASSEMBLING TOOL FOR CONNECTING MULTIPLE TERMINATED WIRES TO A CONNECTOR

DESCRITPION

1. Technical Field

The invention relates generally to a terminal assembling tool and more particularly to a terminal assembling tool for connecting terminated wires to a common bus connector.

2. Background Art

In the formation of wired circuits it is often necessary or desirable to connect a number of conductor wires to the same potential. This may often be effected by connecting those wires to a common bus, or common bus connector. Further, the common bus connector may include a plurality of terminals to which the individual wires, themselves being terminated, are respectively connected. Such connection of several terminated wires to a common bus connector often occurs in the formation of wiring harnesses, as for instance wiring harnesses for automotive vehicles.

The operation of connecting terminated wires to the respective terminals of a common bus connector has often been performed manually, particularly where it is included as one of the steps in the formulation of a wiring harness via a significant use of manual labor. The manual interconnection of terminated wires with the terminals of the common bus connector may prove to be tiring to the operator, particularly where respective terminals are individually connected via the application of opposed manual forces. This may be further complicated if the positions of terminals on the connector are closely adjacent one another such that they interfere with or complicate the manual insertion of terminals.

DISCLOSURE OF THE INVENTION

Accordingly, it is a principal object of the invention to provide a terminal assembling tool for facilitating the connection of multiple terminated wires to a common bus connector.

It is a further object to provide such terminal assembling tool which is capable of interconnecting female terminations on the respective wires with respective male terminals on the common bus connector.

It is a still further object to provide an improved terminal assembling tool which reduces the amount and complexity of manual involvement in the interconnection of terminated wires with the common bus connector.

There is provided a terminal assembling tool for facilitating the connection of multiple terminated wires to a common bus connector. The terminated wires each include a terminal, typically a female terminal, and the common bus connector includes multiple terminals, typically male terminals, extending therefrom in substantially the same direction for interconnection with the terminated wires. The tool includes a first jig for receiving the multiple terminated wires, a second jig for receiving the common bus connector, at least one of the first and second jigs being movable relative to the other between relative proximate and distant positions which respectively correspond with a connecting position and a load/unload position, and means, such as a pneumatic actuator, for actuating the one of the first and second jigs between the connecting and the load/unload positions. Further, the first jig includes means for pre-positioning the terminated wires and the second jig includes means for prepositioning the common bus connector, such that upon actuation of one of the first and second jigs the terminated wires are accurately and completely connected to respective ones of the terminals on the common bus connector.

The terminal assembling tool includes a base member and a pneumatically powered linear actuator mounted via a respective housing to the base member. The first jig is substantially fixedly mounted to the base member and the second jig is connected to the actuating arm of the actuator for reciprocation between the connecting and the load/unload positions.

The common bus connector includes a common base portion having the multiple male terminals extending forwardly therefrom and further having a pair of end fingers disposed at opposite ends thereof and extending forwardly therefrom. The second jig is disposed for actuation in the horizontal plane and includes a cavity therein open at the top and at most of the front end for receiving/discharging the common bus connector via vertical motion thereof and for closely orienting that connector when received in the cavity. The second jig further includes a retainer which extends transversely of the forward end of the common bus connector end fingers so as to engage the end fingers and move the common base portion and connected terminated wires rearwardly in unison for unloading when the second jig is actuated from the connecting position to the load/unload position.

The first jig includes multiple, substantially parallel slots in the upper surface thereof, a respective slot existing for each of the terminated wires. The slots are substantially aligned with respective male terminals on the common bus connector, and each of the slots is contoured at its forward end to retain a respective female terminal therein in alignment with a respective male terminal.

BRIEF DESCRIPTION OF THE DRAWINGS

FIG. 3 is a perspective view of a carriage and channel trays for wire storage and delivery, as used in the wire harness assembling arrangement of FIG. 1;

FIG. 4 is an enlarged view of a hinged double channel tray, as seen in FIG. 3;

FIG. 5 is a perspective view depicting an alternate embodiment of the carriage and channel trays of FIG. 4;

BEST MODE(S) FOR CARRYING OUT THE INVENTION

Figure 1:
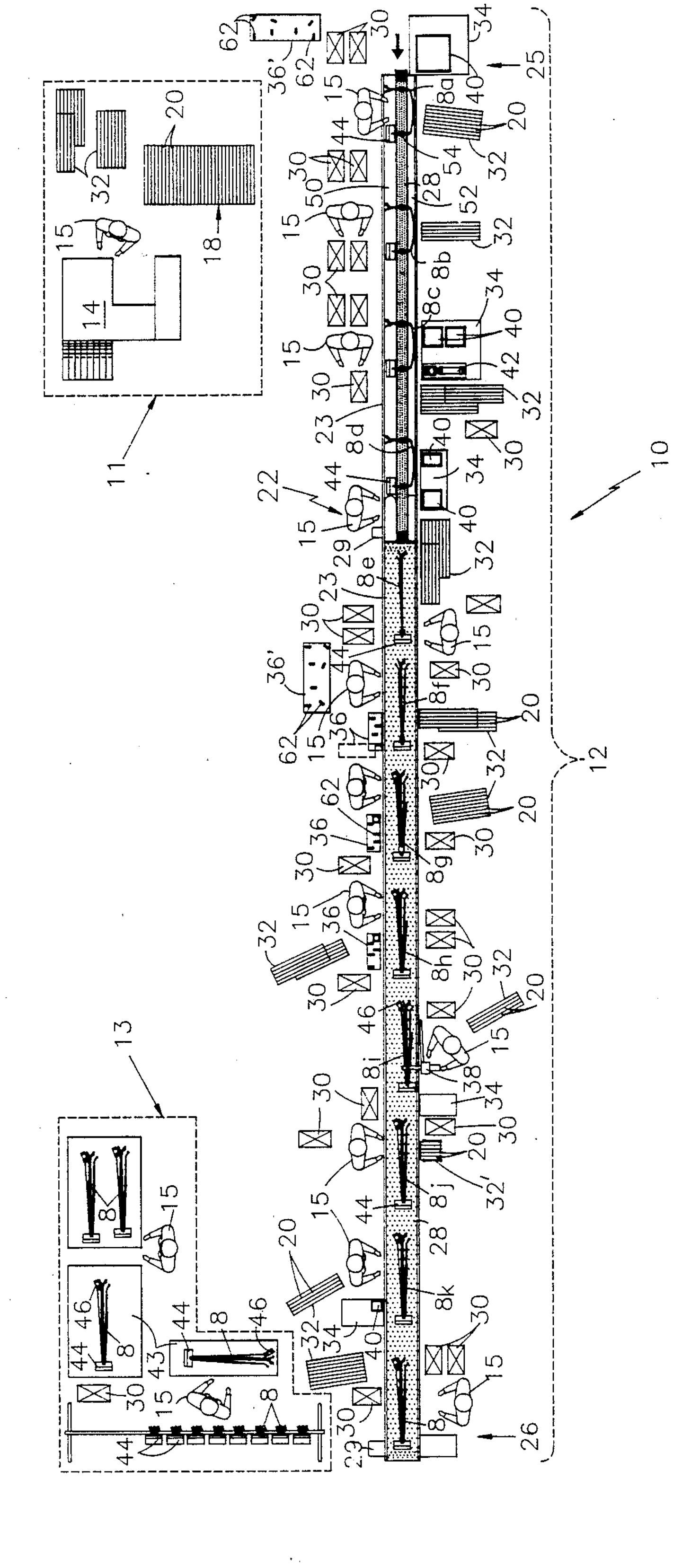
FIG. 1 is a plan view in general diagrammatic form, of a wire harness assembling arrangement in accordance with the invention.

Referring to the figures and initially to FIG. 1, there is depicted in plan view and general diagrammatic form, a wire harness assembling arrangement or system 10 in accordance with the invention. Typically the harness assembling arrangement 10 will be situated in a common area including at least a first region 11 for certain preliminary functions and a second region 12 throughout which the harness assembling function occurs. A third testing region 13 might also be included.

The preliminary functions performed within the first region 11 result in precut, terminated wires 4, and typically include the large scale cutting of wires to predetermined lengths, appropriate stripping of insulation and the application and crimping of terminals 6 (seen in other figures) to one or both ends of most wires. This is done by wire cutting, stripping and terminal crimping machinery 14 of conventional design, as for instance the Komax 40S. The machinery 14 may prepare one or both ends of a wire for receiving a terminal 6 or other termination without actually making the termination. A human operator 15 typically controls the operation of cutting and terminating machinery 14. These wire cutting and terminating functions might be undertaken as batch operations.

Adjacent to the wire cutting and terminating machinery 14 there is also provided initial storage capacity for the temporary storing of wires 4 which have been precut and terminated. This storage is represented by the wire storage shelving 18. The precut and terminated wires 4 stored in shelving 18 are stored in channel trays 20 to be described hereinafter in greater detail. The precut and terminated wires 4 are placed in respective channel trays 20 in accordance with their respective length, gauge, and/or type of termination.

Referring now to the wire harness assembling region 12, there is depicted a mechanized conveyor system 22. The conveyor system 22 consists of one or typically a number of motorized conveyors 23, arranged in a serial or continuous fashion. More specifically, the conveyors 23 are arranged so as to form a line of continuous mechanized transport from an upstream end thereof designated 25 to a downstream end designated 26. In many respects, the conveyors 23 are of conventional design, including supporting framework 27 (seen in FIGS. 2 and 3), moving belts or the like 28, and associated motors 29 for advancing the belts 28 in accordance with a desired schedule. The motors 29 are typically controlled by a controller of known design which is preprogrammed to provide the desired schedule of control. Typically such controllers also possess the capability of manual override and control if such is desired.

A number of local work stations are situated or located along conveyor 23 of conveyor system 22. Since the present wire harness assembling system 10 relies principally upon a number of human operators 15 interacting with various types of tooling and machinery along the conveyor system 22, those work stations will, for convenience herein, be represented by the same symbols and reference numbers which represent the presence of a human operator 15. It should be understood, however, that a work station 15 might also be represented in certain limited instances by machinery capable of automated operation and/or by manually operated machinery to which an operator 15 moves from a different work station.

At each work station 15, wire harness manufacturing and assembly equipment of various types and capability is located depending upon the one or more functions to be performed thereat. Representative of such equipment are the terminal dispensing and crimping machines 30, the stands or mobile carriages (carts) 32 which typically support a number of the channel trays 20 which in turn contain the respective precut and terminated wires 4, stationary worktables 34, loom tables and particularly pivotable looms 36, one or more taping machines 38 and various receptacles or containers 40 containing the appropriate hardware to be included in the wire harness at that location. Certain types of assembly tooling, as for instance the terminal assembling tool 42, may also be located at the work station 15, and located upon a respective worktable 34.

It should be mentioned at this juncture that the arrangement of the work stations 15 along the conveyor system 22 and the work functions performed thereat, are designed to minimize or eliminate the need for the operator 15 at that work station to have to walk more than a step or two. In many instances, the operator 15 may be able to be seated at the work stations. In some instances, of course, it will be necessary for the operator 15 to take a step or two in performing the respective work function, but such movement is generally quite limited. This characteristic exists because most of the equipment required at a work station 15 is closely arranged about that work station on one or both sides of the conveyor 23 and further, because conveyor belt 28 is advanced only periodically so as to move the work in process from one work station to the next.

The wire harness 8 undergoing fabrication at any particular work station 15 is, generally speaking, at rest while at that work station. For this reason, it will be noted that the spacing between successive work stations 15 along conveyor 23 is substantially the same in most instances. It will be understood, however, that some variation in this spacing may occur to accommodate two operators at one or two work stations 15 performing functions on the same wire harness 8, but at opposite ends thereof. In the system depicted herein, the space between successive work stations is approximately 2–3 meters, the number of work stations is in the range of 8–12, and the conveyor belt 28 is incremented or advanced from one work station 15 to the next at intervals of several minutes.

It will be understood that optimum efficiency is obtained if each operator just completes their allotted functions at the respective work station 15 immediately prior to the conveyor belt 28 being incremented. This of course requires a judicious balancing of the numbers and types of functions to be performed at a work station 15, as well as a consideration of the capabilities of the respective operator 15 thereat. Because much of the equipment at each work station 15 is mobile or relatively light weight, it may be easily moved from one work station to another during setup of the wire harness assembling system 10 for the manufacture of a particular type of wiring harness. Indeed, it is the aforedescribed flexibility of the present wire harness assembling system 10 which enables it to be employed economically to manufacture wire harnesses of various sizes and configurations at different times. Although the present system does rely significantly upon acceptably-priced manual labor, it does reduce the large capital cost and inflexibility of a more automated system. Further, the program of work flow and the equipment employed herein provide the economies and flexibility desired.

In FIG. 1, the wire harness 8 is depicted in its completed form at or near the downstream end 26 of the conveyor 23. Wire harness 8 has its beginning or inception at the upstream end 25 of conveyor 23, where, in its earliest "embryonic" form it is identified as wire harness 8a. The wire harness takes on additional form and detail at each of the successive work stations and thus, is identified by a successive alphabetical suffix following the basic wire harness reference numeral 8. Moreover, the portrayal of the wire harness assembling system 10 in FIG. 1 depicts the conveyor 23 at the moment just prior to it being advanced from one work station 15 to the next. Thus, the wire harness at each work station 15 is depicted in the condition or stage representing completion of the work provided at that work station. When the completed wire harness 8 appears at the downstream end 26 of conveyor 23, an operator 15 removes the harness from the conveyor and transports it to a suitable test board 43 in testing region 13 where it is tested for electrical accuracy and integrity. In the illustrated embodiment, the finished harness 8 is synonymous with an unused reference suffix 81.

The completed wire harness 8 often includes 200-300 wires and may be more than 2 meters in length. The harness 8 typically includes a number of different "arms" or "branches", each being comprised of differing numbers of wires. Typically, those branches are physically, if not also electrically, collected in a common region represented by a junction box 44 through which most of the circuits pass. The junction box 44 may sometimes also be referred to as the "head" of the harness 8. Still further, many of the branches of the completed wire harness 8 terminate at their opposite ends in respective multi-terminal connectors 46 of differing types and configurations. It will be appreciated that the embryonic harness 8a includes a junction box 44 and relatively few wires and is, accordingly, relatively supple, deformable and of light weight. On the other hand, as formation of the harness 8 progresses, it becomes heavier and is relatively less supple.

Figure 2:
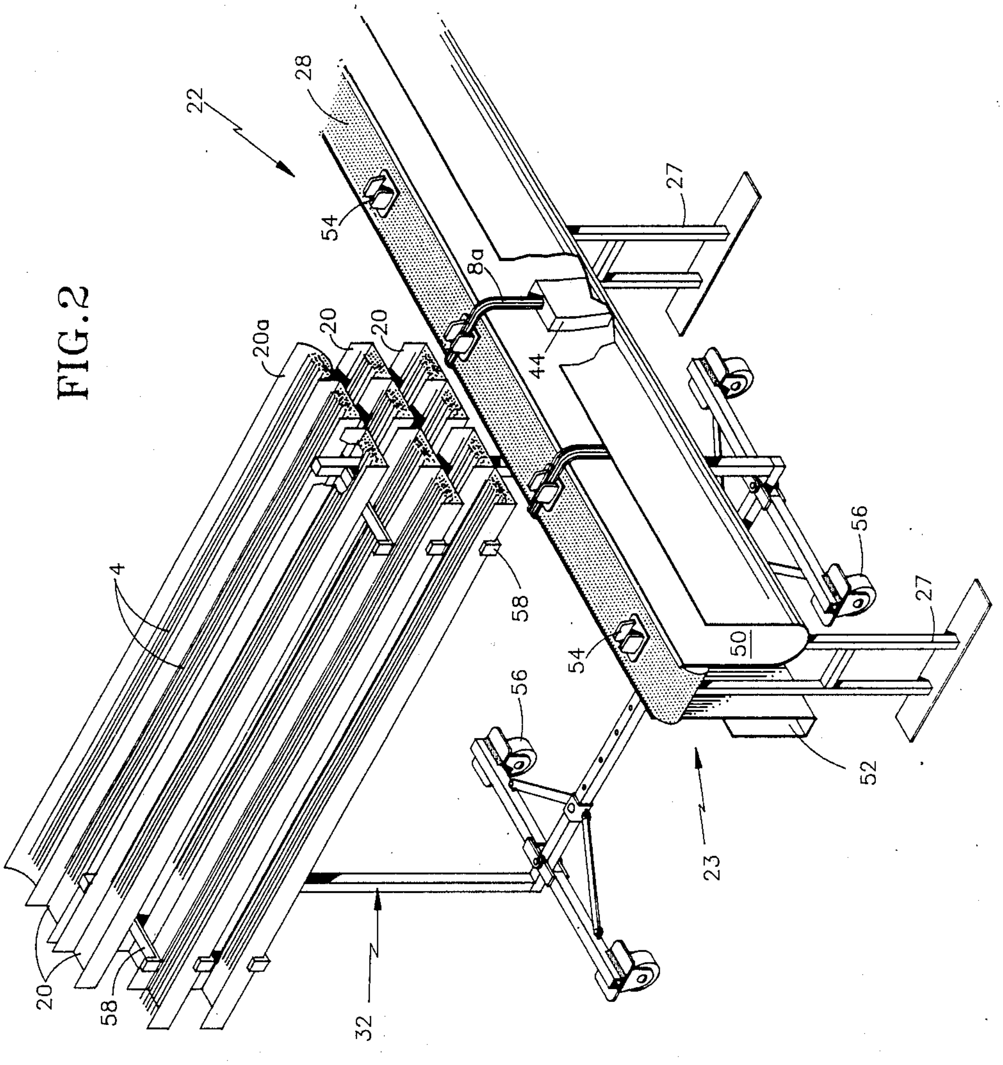
FIG. 2 is a perspective view of a portion of the wire harnesses assembling arrangement, taken at the upstream end of FIG. 1.

Referring further to FIG. 1, and additionally to FIG. 2, it will be seen that the conveyor system 22 is provided with at least a primary trough 50 and perhaps also a secondary trough 52 on respectively opposite sides of the conveyor 23 along that portion of the conveyor toward its upstream end 25 in which the embryonic wire harness 8a, 8b, 8c, etc. is formed. Troughs 50 and 52 extend along the upstream portion of conveyor 23 to permit the embryonic wire harnesses 8a, 8b, etc. to extend across, or transversely, of the conveyor belt 28 in a back and forth U-shape or serpentine fashion in which parts of the wire harness extend beyond the sides of the conveyor and hang or depend into the troughs 50, 52. It has been found most convenient to arrange the first two or three work stations 15 on one particular side of the conveyor 23 and to provide the primary trough 50 along that same side of the conveyor.

The primary trough 50 is of a generally deep U-shape in cross section and may typically extend 1.5-1.66 meter below the surface of the conveyor belt 28. Primary trough 50 is sufficiently wide to conveniently accommodate a large junction box 44 resting therein as depicted in FIG. 2. Moreover, the trough 50 is sufficiently wide and smooth to facilitate the sliding of the embryonic harnesses 8a, 8b and associated junction boxes 44 therewithin as the conveyor belt 28 advances. The depth of primary trough 50 is sufficiently shallow that various parts of the embryonic harness 8a, 8b and/or random components to be affixed to the harness may rest upon the bottom of the trough and are within reach of the operator 15 thereat. Further, the vertical walls inside of troughs 50 and 52, and particularly those walls adjacent conveyor 23, are relatively smooth and preferably continuous so as to prevent interference of the conveyor frame 27 with the embryonic harness 8a and junction box 44 as the conveyor belt 28 advances and to prevent chafing of the harness on the troughs.

The secondary trough 52 on the opposite side of conveyor 23 is somewhat more optional than the primary trough 50, and serves to facilitate the smooth flow of the embryonic harness 8a, 8b as it moves along the conveyor 23. Moreover, trough 52 serves to "catch" any components which may chance to fall free of the harness on that side of the conveyor. Since it is contemplated that the larger elements of the embryonic wire harness 8a, such as the junction box 44, will be in trough 50, the secondary trough 52 need not be as wide as trough 50.

The troughs 50 and 52 may be formed of any suitable material such as sheet metal, plastic or fiberglass which is contoured to the appropriate shape. The troughs 50 and 52 are affixed to the conveyor frame 27 in a suitable manner, as by screws, bolts and/or brackets such that they are adequately supported at a level providing a smooth transition of the embryonic harness 8a, 8b from the conveyor belt 28 into and out of the troughs 50, 52. In fact, troughs 50, 52 may be provided with curved lips at their uppermost ends to prevent chafing and cutting the wire harnesses 8a, 8b and/or the operators 15.

Referring to the initial construction of wire harness 8a, a junction box 44 is taken from a storage container 40 at the upstream end 25 of the conveyor. Various wires 4 are taken from various ones of the channel trays 20 supported on carriage 32 also located near the upstream end 25 of conveyor 23. The wires 4 are then connected with the junction box 44 by the first operator 15 to form the embryonic harness 8a. It will be understood that additional operations on the wire harness 8a at that work station may include the application of additional terminals to one or more of the wires 4 via the terminal dispensing and crimping machines 30. One or more other containers 40 near the upstream end 25 of conveyor 23 may contain various types of connectors 46 for connection with the terminals at the opposite ends of some of the wires 4 connected to junction box 44.

Because the embryonic harnesses 8a, 8b may be arranged across the conveyor belt 28 and thus compressed in the longitudinal direction, the entire length of the harness is easily within the reach of a single operator 15 at the respective work station. Thus, a single operator 15 may perform work functions on the entire length of the embryonic harness 8a without needing to move a significant distance within the work station. Moreover, the longitudinal extent of the conveyor belt 28 occupied by the embryonic harnesses 8a,8b, etc. is considerably less than will be required in the later stages of formation farther downstream.

Because portions of the embryonic harnesses 8a, 8b, etc. extend transversely of the conveyor belt 28, it has been found helpful to provide members on the conveyor belt 28 in that region for engaging the harness to assist with its positioning while work functions are performed and to further assist with moving the harness with the conveyor belt 28 when it is advanced. These engaging elements may take the form of the pairs of fingers 54 seen most clearly in FIG. 2. Each finger pair 54 is affixed at its base to the conveyor belt 28, as by a suitable bonding agent and/or mechanical fasteners, and includes a pair of fingers spaced from one another in the direction of conveyor belt travel. In this way, a portion of the harness 8a extending transversely of the conveyor belt 28 may be positioned between the fingers of member 54. Each finger pair member 54 may be formed of rubber or a rubberlike material and the dimensioning and structure of the fingers is such that they may resiliently engage the harness therebetween. The spacing between successive finger pair members 54 may be about 0.5 meter, more or less. Since the principal advantage of the finger pairs 54 described above is in the embryonic formation of the wire harness 8a, 8b, 8c, etc., they may be omitted from the conveyor belt 28 downstream if the conveyor system is formed of multiple separate conveyors 23 and associated conveyor belts 28, as is typically the case.

Additional consideration is now given to the structure and function of the channel trays 20 and the associated stands or carriages 32 upon which they are supported, with particular reference to FIGS. 3–5. Each channel tray 20 typically receives precut terminated wires 4 of a particular type and length. In this way, there is no mixing of wires 4 of different types within a single channel tray 20. Channel trays 20 are generally U-shaped, are elongated and are open at least at a discharge end, and preferably at both ends. The channel trays 20 may be of differing lengths, depending principally upon the length of wires 4 to be stored therein, with the majority ranging in length between 1 and 2 meters although they may be shorter or longer. While the classic rounded U-shape of continuous curvature is a suitable contour for the cross section of channel trays 20, as depicted specifically with respect to channel tray 20a in FIG. 3, it has been found preferable to employ a modified U-shape which includes a flattened bottom and substantially vertical sides, as the majority of such trays are depicted in the various figures. Such flat-bottom U-shape configuration appears to afford a more even distribution of the wires 4 contained therein and reduces the incidence of tangling which would interfere with the removal of individual wires from the tray. Perhaps the curved cross section of channel tray 20a results in a greater number of wires 4 being at the center of the tray and thus contributes somewhat to tangling. The channel trays 20 are formed of any suitable, relatively rigid and durable material, as for instance, metal, plastic or fiberglass.

If the wires 4 in a particular channel tray 20 are terminated at only one end, it is that terminated end which is presented to the operator 15 when the tray 20 is supported in position on a carriage 32 adjacent to a particular work station. It will be understood that supported channel trays 20 may be positioned on either, or both, sides of the conveyor 22 relative to the position of the operator 15 who will be drawing wires 4 from those trays. Perhaps the most common arrangement and that which permits easiest access by operator 15 to a relatively large number of channel trays 20, is that in which the carriage 32 supporting those trays is positioned opposite the operator 15 across the conveyor 23, as seen specifically in FIGS. 2 and 6.

In certain instances in which the length of a wire 4 is unusually long and greatly exceeds the length of a single channel tray 20, a pair of such trays may be joined at their respective forward ends by a suitable connector or fastener, such as hinge 55, to form a double tray designated 20' in FIGS. 3 and 4. In that instance, one portion of each of the long wires 4 is contained in one of the channel trays and the remaining portion is contained in the other, with the wires transitioning between trays just beyond the forward ends of the trays in the region of the hinge 55 so as to be readily available for removal by an operator 15. The connecting hinge 55 provides a convenient means for joining the two trays 20 forming the combined unit 20' for ease of handling during loading and transport.

The stands or carriages (carts) 32 upon which the various channel trays 20 are supported may be of relatively simple design and inexpensive construction. In some few instances, the stands 32 may be permanently stationary and thus have no requirement for mobility. In most instances, however, it has been found desirable for the stands or carriages 32 to be mobile, and thus some form of rollers or wheels 56 are provided on cross-members 57 at the base of carriage 32. In some instances it may be desirable to reduce or "sweep" the profile of the cross-members 57 and wheels 56, as by making them adjustable via struts 59 in the manner depicted in broken line in FIG. 3.

The channel trays 20 are simply rested upon cross-arms or shelves 58 which form part of the rigid structural framework of the carriage. The flat base of channel tray 20 may simply rest upon a flat surface of a horizontal crossarm 58. In the event the curved U-shape channel tray 20a is to be employed, it may be appropriate to provide curved recesses on or in the crossarms 58 to accommodate the curved bases of those trays or alternatively, curved brackets might be attached to the crossarms 58. To provide adequate support for a tray 20, it is only necessary that there be a pair of simple crossarms spaced fore and aft on carriage 32 such that they support the channel tray A number of channel trays 20 may be supported in side by side relation on any one crossarm 58, and the carriages 32 typically also include crossarms 58 at several levels to accommodate channel trays at those differing elevations.

Although the carriages 32 described above provide horizontal orientation of the associated channel trays 20, a carriage 32' is constructed such that the trays 20 are supported thereby in a near vertical orientation, as depicted in FIG. 5. These stands or carriages 32' may be of somewhat simpler construction than the carriages 32 and, because of the vertical orientation of trays 20, will occupy relatively less floor space. On the other hand, in such vertical orientation it is generally preferable to have only one row or level of trays 20 and their length will be limited to that which is within a reasonable height range of the operators 15.

It has been found useful to mount resilient clamps 60 on at least those channel trays 20 which are intended for vertical orientation, for the purpose of retaining the forward or upper ends of the wires 4 in position for easy access by an operator 15. More specifically, clamps 60 may be mounted to the undersurface of trays 20 at or near the forward, upper, or discharge end thereof for engaging a bundle of wires 4 which hangs over that same end of the channel tray. In this way the wires are prevented from falling down within the channel tray 20 when it is in its vertical orientation and the ends are conveniently presented for easy removal.

During the assembly of the wire harness 8, it is occasionally necessary or desirable to provide additional work surface for the connection of wires 4 to connectors 46 in the formation of various subassemblies and to facilitate the integration of such subassemblies into the main harness appearing on the conveyor belt 28 at that work station 15. In some instances, that work may be accommodated on simple stationary worktables 34 if they are positioned sufficiently near the operator 15. Also, additional work surface is provided by loom tables 36 and 36'.

Each of the loom tables 36, 36' includes a number of wire or harness-supporting jigs 62 mounted on the upper surface thereof in a predetermined pattern for aiding in the formation of the harness 8 or, more likely, a subassembly or branch to become part of the main harness. The jigs 62 typically include a base portion 63 which is mounted to the loom table 36 or 36', and a vertical support portion 64 extending upwardly therefrom and being bifurcated at its upper end to form a pair of harness-supporting fingers 65. The arrangement of the jigs 62 on loom tables 36, 36' is such as to define multiple wiring and branch paths during the formation of the harness or a harness subassembly. The loom tables 36' are typically on wheels to permit easy positioning and repositioning of the tables in the region of the conveyor 23. In the system diagram depicted in FIG. 1, movable loom tables 36' are positioned sufficiently close to the conveyor 23 that relatively few steps are required by an operator 15 to move a harness or a harness subassembly between the conveyor and the respective loom table. On the other hand, it will be noted and understood that the wheeled loom table 36' is capable of general movement in the region of a work station and may in fact be positioned such that an operator/work station 15 is positioned between the loom table 36' and the conveyor 23.

Figure 6:
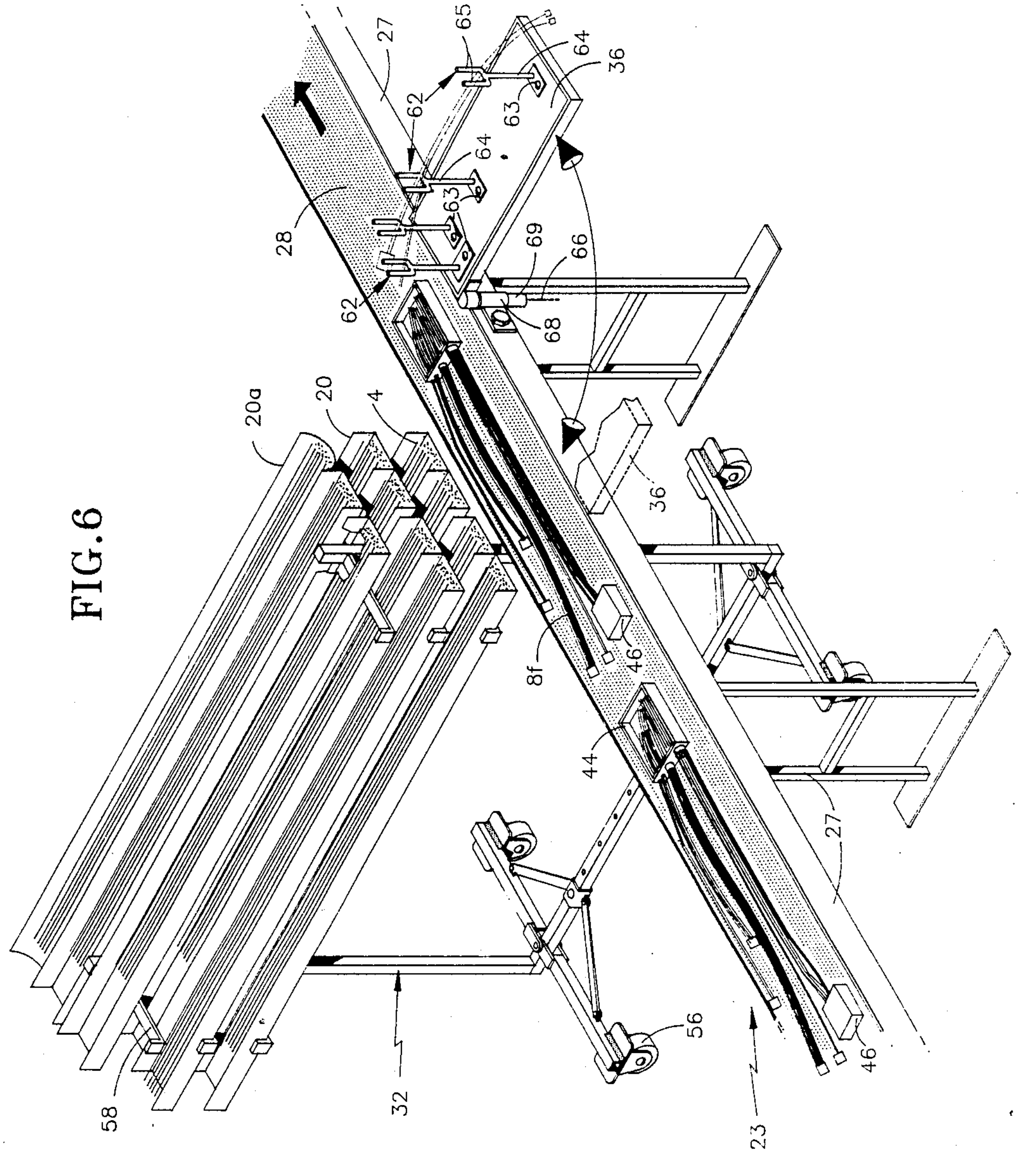
FIG. 6 is a perspective view of a portion of the wire harness assembling arrangement of FIG. 1, showing a pivotable loom table.

On the other hand, the loom table 36 may be even closer to the conveyor 23 and is capable of certain limited displacement by an operator 15, as by being pivoted, between an operating position and an idle position, as depicted in FIGS. 1 and 6 adjacent wire harness 8f. In FIG. 6, the loom table 36 is illustrated at its idle position in solid line, and at its idle position in broken line. In this instance, the operating position places the loom table 36 closely adjacent and parallel to the conveyor 23, whereas the idle position is achieved when the table 36 is rotated approximately 90 degrees away from the conveyor about a pivot axis 66 which is remote from the operator 15 and generally near the conveyor 23. In its operating position, the loom table is positioned for easy access by the operator 15 to perform the various work functions on the harness or harness subassembly as required. On the other hand, when such work is completed, the harness or subassembly may be conveniently removed from the loom table 36 and placed on the conveyor belt 28, and the loom table may be pivoted to its idle position, thereby affording the operator increased space for the performance of other work functions at that particular work station.

It has been found particularly convenient to mount the loom table 36 to the frame 27 of conveyor 23 for pivotal rotation about pivot axis 66. More specifically, a journal or gudgeon 68 may be mounted to the conveyor frame 27 and a pivot pin or pintle 69 extends downwardly from the underside of loom table and through the gudgeon 68 to provide the pivot axis 66. It may be desirable to provide some form of lock or clamp or detent associated with gudgeon 68 and pintle 69 so as to retain the table 36 at a selected position about the pivot axis. One relatively simple way of providing the detent is to provide a pin or dog extending radially from the pintle 69 near its upper end and to contour the upper end of the gudgeon so as to provide detenting recesses for the pin at desired angular locations thereabout.

Figure 7:
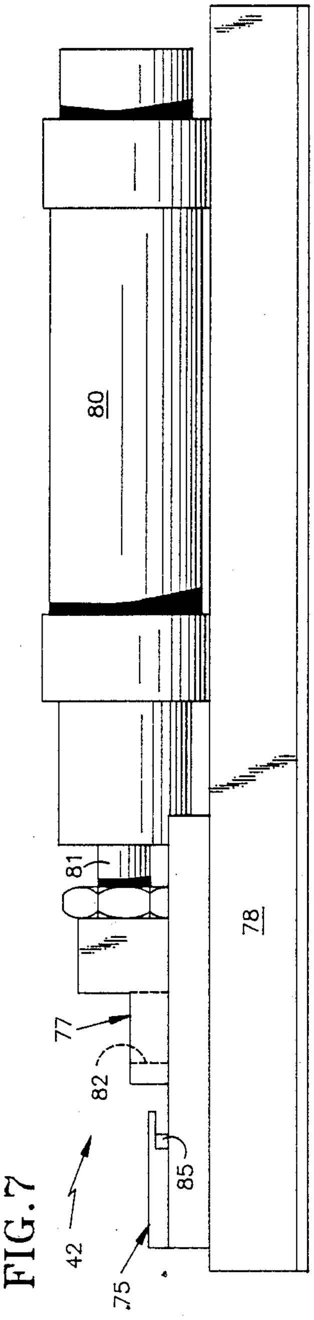
FIG. 7 is a side elevation view of a terminal assembly tool employed in the wire harness assembling arrangement of FIG. 1.
Figure 8:
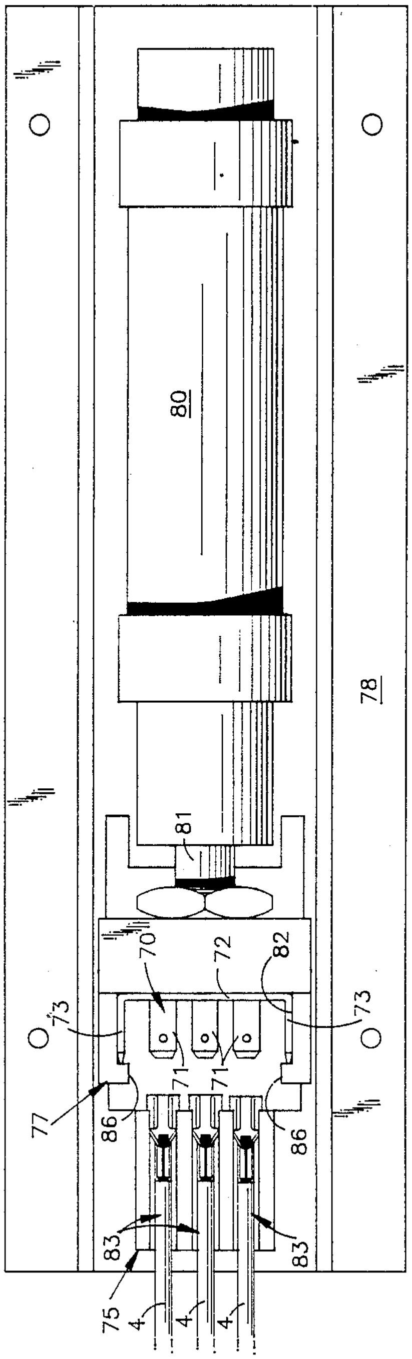
FIG. 8 is a top view of the terminal assembly tool of FIG. 7, showing terminated wires and a common bus connector prior to connection.
Figure 9:
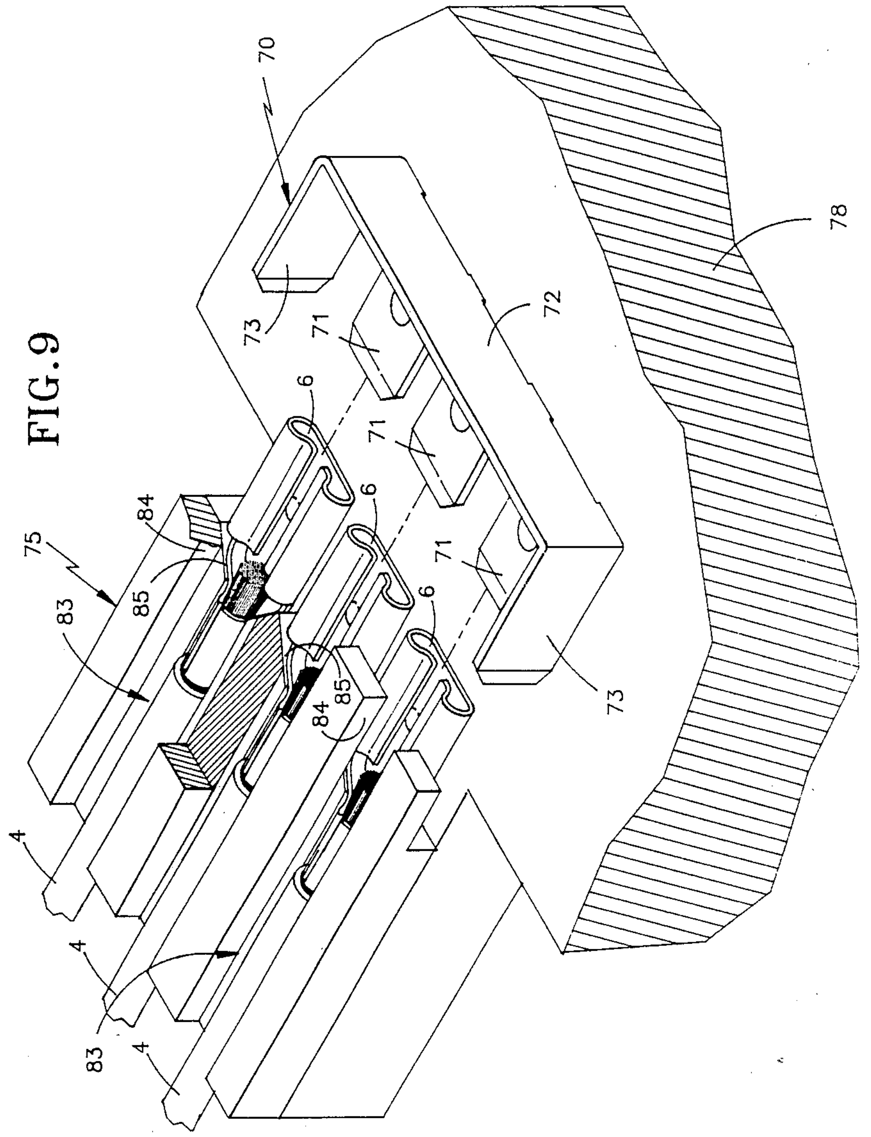
FIG. 9 is an enlarged perspective view of a portion of FIG. 8 showing a jig, the terminated wires and the common bus connector.

Referring to FIGS. 7–9, further attention is given to a particular item of assembly tooling, that being the terminal assembling tool 42. Tool 42 is designed to easily and accurately accomplish the connection of several terminated wires 4 to a common bus connector 70. Common bus connector 70 is utilized to connect those several wires to a common electrical potential, as for instance B+ or ground in an automotive electrical system. In fact, the current-carrying capacity of the wires 4 which are connected to bus connector 70 is typically greater than that of many of the other wires in the wiring harness 8. The terminals 6 on the ends of the respective wires 4 are of a female-type, and are adapted to receive and be connected to the male, spade-type terminals 71 of bus connector 70. The bus connector 70 in the illustrated embodiment includes three such male terminals 71 extending forwardly from a common base portion 72 in substantially coplanar parallel relation. Side or end fingers 73 extend forward from each end of the common base 72 of connector 70. For the illustrated connector 70, each of the male terminals 71 extends from an edge of the common base portion 72, whereas the end fingers 73 are created by respective 90 degree bends in that base portion and thus extend in respective planes which are perpendicular to the plane containing the male terminal 71. The end fingers 73 may themselves subsequently be placed in electrical connection with other conductive members.

The terminal assembling tool 42 aids in accurately positioning the terminals 6 relative to the male terminals 71 of common bus connector 70 and further contributes not only to the easy connection of those elements but also, to the removal of the connected terminals from that tool. Tool 42 includes first and second jigs 75 and 77 respectively. Jig 75 is structured to receive the terminated ends of several wires 4. Jig 77 is structured to receive the common bus connector 70 oriented in a substantially horizontal disposition. Jigs 75 and 77 are mounted on a base member 78 in a manner allowing one of the jigs to move relatively toward and away from the other between relative proximate and distant positions respectively corresponding with a connecting position and a load/unload position. In this embodiment, jig 75 remains stationary and jig 77 is capable of linear motion transversely of base 78.

A pneumatic actuator, such as the piston and cylinder 80, is connected with the base member 78 and the jig 77 to effect and control the displacement of that jig relative to jig 75. The piston arm 81 of actuator 80 is positively connected to jig 77, as by welding or threaded engagement or the like, to positively reciprocably displace that jig. The cylinder of actuator 80 is rigidly mounted and provides significant lateral stability to jig 77. However, to the extent that further lateral guidance of that jig is required, a raceway may be machined in the base member 78 to assure alignment with jig 75.

At the forward end of jig 77 there is provided a chamber or cavity 82 which is open in both the forward and upward directions. The cavity 82 is adapted to receive a common bus connector 70 deposited from above, and is open at its forward end to permit mating engagement with the terminals 6 supported in jig 75. With the common bus connector 73 disposed horizontally as depicted in FIG. 9, a clearance exists beneath the undersurfaces of the male terminal 71 sufficient to permit the insertion thereon of the female terminals 6.

Jig. 75 includes several longitudinally extending slots 83 in the upper surface thereof for receiving the respective wires 4. More specifically, the grooves or slots 83 define sidewalls 84 which are undercut near their forward ends to provide seats 85 for the terminals 6. The undercut in the walls 84 is such that the terminal seats 85 contain the terminals 6 captive in both a vertical and lateral direction when inserted and seated therein as depicted in FIGS. 8 and 9.

In FIGS. 7–9, jig 77 is shown in its load/unload position, displaced from jig 75. Thus, the terminal 6 of a terminated wire 4 may be loaded into jig 75 by disposing the terminal forwardly of the forward end of jig 75 and moving the terminal and the wire 4 downward until the terminal is at the level of the terminal seat 85. Rearward tensioning of wire 4 then serves to seat the terminal 6 in terminal seat 85. This same operation is repeated for the other two terminated wires (not shown) with respect to the other two slots 83 in jig 75. Similarly, the common bus connector 70 is loaded into jig 77 by dropping it into cavity 82 in the orientation depicted in FIG. 7*b*. The rear and sidewalls of jig 77 which define cavity 82 are sized and configured to orient common bus connector 70 such that its terminals 71 are in constant alignment with the female terminals 6. Actuation of jig 77 via actuator 80 serves to bring the male terminals 71 into mated engagement with the female terminals 6, thus completing the connection.

Retaining elements 86 are formed at the forward end of the jig 77 by a pair of projections extending transversely a short distance toward one another to provide a partial closure to the forward end of cavity 82. More specifically, retaining elements 86 extend across the forward ends of the end fingers 73 on the common bus connector 70. Following connection of the terminals 6 and their associated wires 4 to the common bus connector 70, actuator 80 operates to withdraw arm 81 and move jig 77 rearward to the load/unload position. During that motion, the retaining members 86 on jig 77 engage the end fingers 73 and the common bus connector 70 is displaced rearward also. Such rearward displacement of a common bus connector 70 dislodges the female terminals 6 from their seated positions in jig 75, thus facilitating removal of the connected wires and connector from tool 42 by a simple lifting upward of the several wires 4 in unison to remove connector 70 from cavity 82.

At various stages in the formation of wire harnesses 8, it is desirable and necessary to gather and bind certain ones of the wires to form branches within the harness. In some instances, those branches will terminate in connectors or other types of electrical termination. To bind the branches of a wire harness 8, it has been conventional to bind or wrap adhesive tape in a helical pattern about the collection of wires which form the branch. In some instances the tape is wound entirely manually, but in other instances mechanized devices have been used. In the present system, an improved taping arrangement is depicted at the work station containing taping machine 38 and adjacent to which the harness 8*i* is positioned. Both the taping machine 38 and the arrangement of which it is a part are of improved design, as discussed in the following description with particular reference to FIGS. 10–12.

Figure 10:
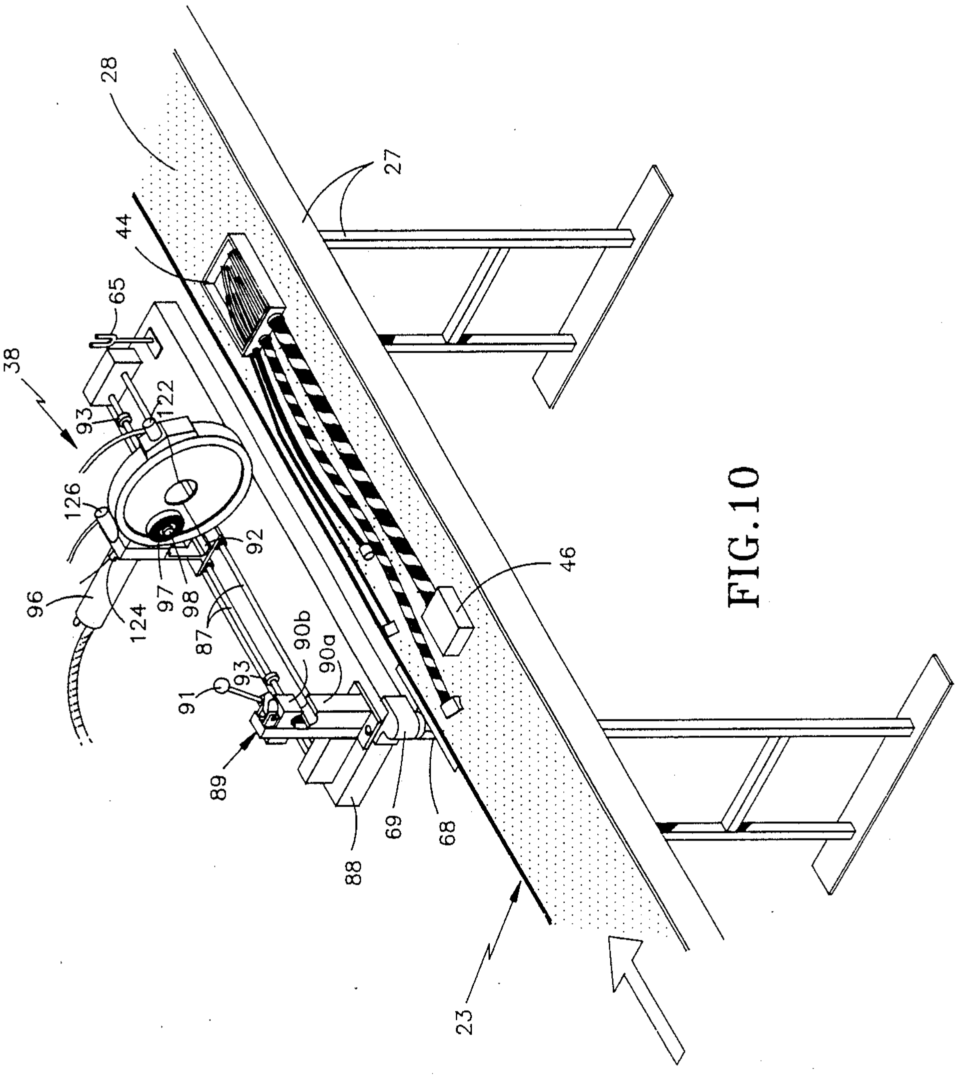
FIG. 10 is a perspective view of a portion of the wire harness assembling arrangement of FIG. 1, showing a taping machine in a taping arrangement.

Referring to FIG. 10, there is depicted the taping machine 38 mounted for translation along a pair of rails 87 which are in turn mounted to and supported by a platform 88. The platform 88 is pivotally mounted to and supported by the frame 27 of conveyor 23 in the same way as pivotable loom tables 36, as by a gudgeon 68 and pintle 69 of the type earlier described. The work platform 88 may be long and narrow and formed of a rigid material such as metal, wood or plastic. Toward one end of the platform 88 there is mounted a bifurcated harness support 65 of the same general type as earlier described with respect to the loom tables 36. Relatively near the other end of the work platform 88, there is positioned a mechanism for gripping or clamping the harness, such as the clamping mechanism 89.

The clamping mechanism 89 is rigidly mounted to platform 88 and extends upwardly therefrom for releasably engaging a bundle of wires which form a branch of harness 8*i*, to permit the application of a tensioning force to the harness branch during the taping thereof. The clamping mechanism 89 may be of any suitable construction and typically includes a pair of jaws 90*a*, 90*b*, one or both of which are movable vertically between clamping and release positions by means of a manual actuating arm 91. Conveniently, the lower jaw 90*a* is stationary and the upper jaw 90*b* is moved vertically by actuation of the arm 91 in a vertical plane about a horizontal pivot axis. Actuating arm 91 may be pivoted downward from its release position shown in FIG. 10 to some over-center locked position in which jaws 90*a* and 90*b* firmly grip a branch of the harness placed therebetween. The jaws 90*a*, 90*b* may be concavely contoured to the general circular shape of a harness branch. Further, a spring or other bias element is typically associated with one or both of the jaws 90*a*, 90*b* such that they resiliently and yieldably engage harness branches of differing diameters.

Platform 88 serves as a mounting frame for the parallel rails 87, which in turn support the taping machine 38 in sliding relation therewith via slide bracket 92 which slides along the rails between a pair of adjustable stops 93 positioned toward relative opposite ends thereof. The stops 93 may be positioned on only one of the rails 87 and are manually adjustable as by thumbscrews.

Figure 11:
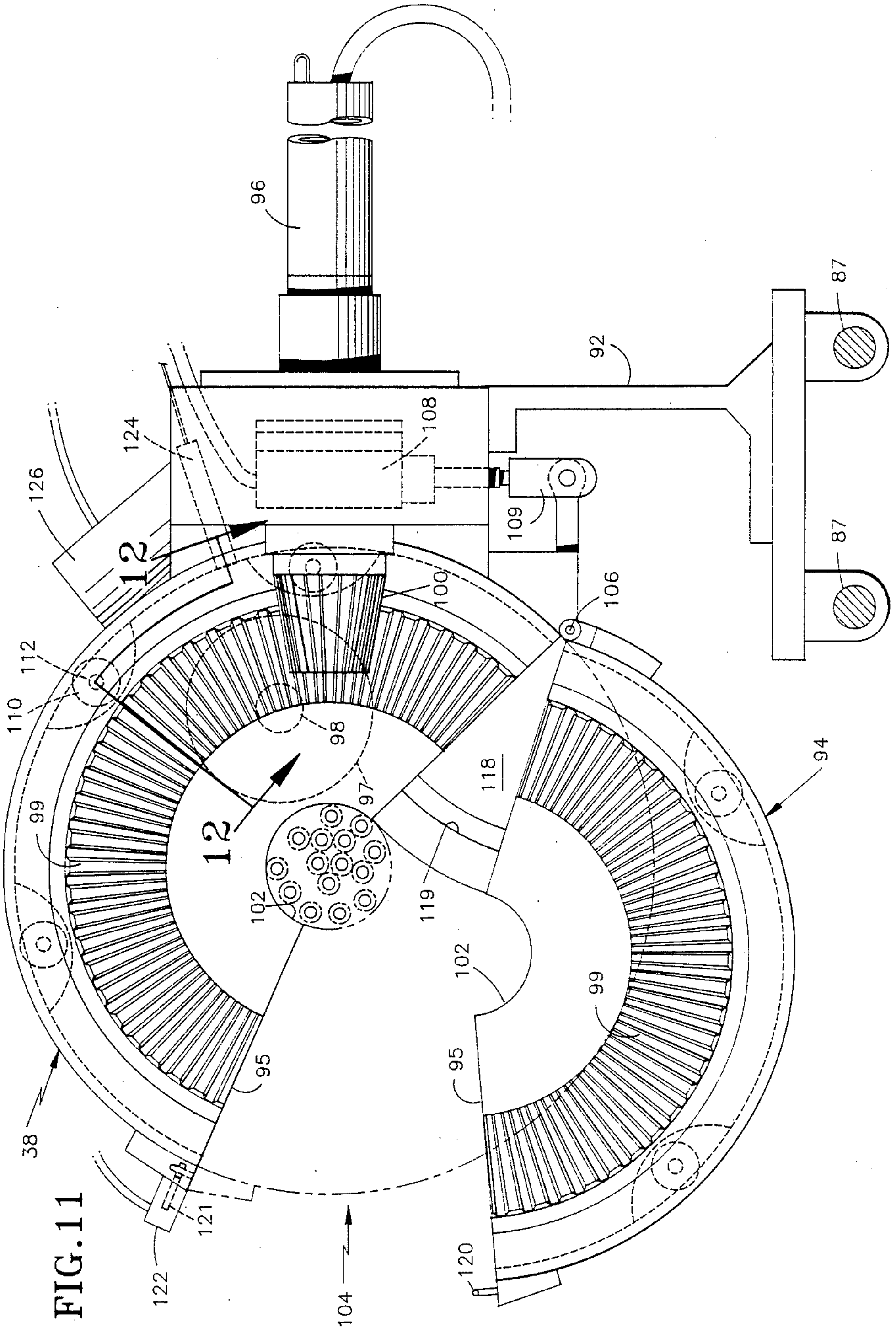
FIG. 11 is a view of a taping machine of FIG. 10, as viewed looking relatively upstream.

Referring to FIG. 11, the taping machine 38 is considered in greater detail. Generally speaking, taping machine 38 includes a two-piece housing 94, a two-piece orbiting disc or plate 95 and a tape dispensing arrangement, such as the spool of tape 97 mounted on orbiting plate 95 via spindle 98.

The orbiting plate 95 is driven by motor 96 via a pinion 100 in driving engagement with an annular bevel gear 99 on the face of plate 95. The orbiting plate 95 includes a circular central opening 102 through which the branch of the wiring harness to be taped extends during the taping operation. The plate 95 may be of a suitable material such as metal, plastic or a composite.

Although the housing and/or the orbiting plate 95 might be formed such as to be non-opening, it will be appreciated that the harness branch to be taped would require both insertion and removal axially through the center opening 102. This may be both cumbersome and limits the size of connectors that may have been previously connected to an end of that branch. Instead, as depicted in FIG. 11, both the housing 94 and the orbiting plate 95 are formed of two pieces, and the housing is hinged to permit being opened at a forward end to create a mouth 104 through which a wire harness branch may be admitted to and removed from the central opening 102 without requiring axial movement of the branch. In the illustrated embodiment, the lower portion of housing 94 and of orbiting plate 95 are angularly coextensive and are less than 180 degrees, whereas the respective upper portions of each are somewhat greater than 180 degrees. The lower portion of housing 94 is connected to the upper portion via a hinge mechanism 106. Hinge 106 is in turn connected to a pneumatic actuator 108 via linkage 109. Operation of the actuator 108 serves to move the lower portion of housing 94 up and down between closed and open positions respectively.

Figure 12:
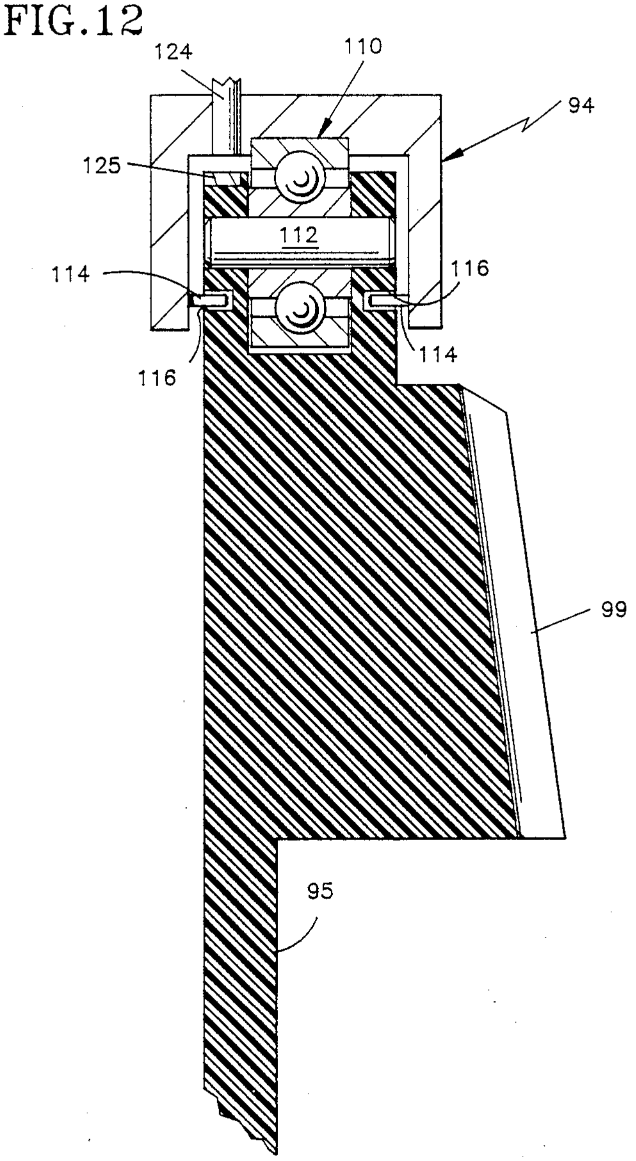
FIG. 12 is a sectional view of a part of the taping machine, taken along line 12—12 of FIG. 11.

As best seen in FIG. 12, the housing 94 is C-shaped in cross section to provide a housing and raceway for the two-piece plate 95 which orbits therewithin. The outer circumference of the two-piece orbiting plate 95 is sufficiently narrow to fit within the housing 94, but sufficiently wide to include several slots extending radially therein about the circumference for the mounting of several respective roller bearings 110. The roller bearings 110 are mounted in position by respective pins 112 which extend in an axial direction through plate 95 and upon which the bearings are mounted for rotation. The roller bearings 110 provide the principal supporting contact between the housing 94 and the orbiting plates 95. Additionally, to retain each of the orbiting plates 95 captive within the respective housing portion 94 when the housing is open, there are provided axially extending notches 114 in the opposite sidewalls of the orbiting plates 95, and retaining pins 116 mounted in the opposed sidewalls of the housing 94 extend therefrom into the notches 114. A connecting bracket 118, seen in FIG. 11, spans the two halves of the housing 94 and includes a slotted keyway 119 in which a key (not shown) associated with one of the halves slides in order to guide a relative opening and closing motion between the halves.

It will be understood that although the orbiting plate 95 is formed in two complementary portions, the portion which is being driven at any moment by pinion 100 serves to drive or push the other plate portion such that it follows. Pinion 100 spans both halves of the orbiting plate 95 at the two positions of interface therebetween. Thus, when the two halves of housing 94 are closed as shown in broken line in FIG. 11, the operation of motor 96 drives the pinion 100 which in turn drives the orbiting plates 95, to thereby impart orbital motion to the spool of tape 97 about the wire harness branch positioned within the central opening 102. Assuming the adhesive surface of the tape has first been placed in engagement with the wire harness branch, such orbital motion of the tape spool 97 effects wrapping of the tape about the branch.

To ensure that the housing 94 of taping machine 38 remains closed during operation, there is provided an engaging hinge having a female fastener member 120 on one lip of the housing and a locking pin 121 controlled by pneumatic actuator 122 positioned on the other lip of the housing. Control of the actuator 122 serves to move the locking pin 121 into and out of locking engagement with the female fastener member 120.

For the taping machine 38 to operate correctly, it is important that the two portions of the orbiting plate 95 each stop in positions which are angularly coextensive with the two halves of the housing 94 when the taping machine is to be opened. This assures that the opening of mouth 104 is relatively wide and further, that there is little or no likelihood of the orbiting plate portions becoming separated from the respective housing portions. To accomplish this end, provision has been made for detecting the angular orientation of the orbiting plate 95 within the housing 94 and for stopping rotation of the plate at precisely the correct angle. Detection of the angle is accomplished by an inductive detector 124 mounted on the housing 94 for detecting a specific angular position on the circumference of the orbiting plate 95. That position may be indicated by including a piece of metal 125 on the orbiting plate periphery for appropriate electromagnetic interaction with the detector 124 in a known manner. This form of detection is particularly suited to use with a plate 95 formed of non-metallic material.

Operating in conjunction with the detector 124 is a pneumatic cylinder 126 positioned on the upper portion of the housing 94. Cylinder 126 operates to apply a braking/locking force to the upper orbiting plate 95 to lock it in correct angular position as detected by detector 124. Pneumatic cylinder 126 may act to move a brake or lock member into and out of braking and/or locking engagement with the orbiting plate 95.

Preferably, the motor 96, and the actuator cylinders 108, 122 and 126 are pneumatically driven and are controlled in accordance with an electric program control provided by an OMRON C28K Controller (not shown) in a manner commensurate with the present description. Inputs to that control are provided by START/STOP and OPEN/CLOSE control buttons (not shown) controlled by an operator 15 and additionally by an electrical input from the inductive detector 124. Appropriate actuation of the OPEN/CLOSE control buttons effects the respective opening or closing of the taping machine 38 via actuator 108 and the respective unlocking or locking of fastener 120, 121 via actuator 122. Similarly, appropriate actuation of the START control commences the orbital motion of the tape spool 97 to wind tape about a wiring harness branch, and actuation of the STOP control serves, via detector 124, motor 96 and cylinder 126 to stop the orbiting plate 95 at the correct position.

Thus, to effect the taping of a branch of wire harness 8*i*, the work platform 88 will typically be pivoted to a position adjacent the conveyor 28 and one end of the branch to be taped will be clamped in the clamping mechanism 89. The harness branch will then be moved through the open mouth 104 of taping machine 38 into the central opening 102 and the other end of that branch may then be supported in the bifurcated support 65. The operator 15 may provide a manual tensioning of the harness branch against the resisting clamping force of the mechanism 89. The taping machine 38 is then closed, the tape 97 is led to the harness branch and the motor 96 is then energized to begin the taping operation. The taping machine 38 is manually moved along the rails 87 from one stop limit 93 to the other to perform the tape winding operation. Upon reaching the other limit 93, the operator actuates the STOP button, then severs the tape, as with a knife, and opens the taping machine 38 to permit the removal of the harness branch and its return to the conveyor belt 28.

Although this invention has been shown and described with respect to detailed embodiments thereof, it will be understood by those skilled in the art that various changes in form and detail thereof may be made without departing from the spirit and scope of the claimed invention.

Having thus described a typical embodiment of the invention, that which is claimed as new and desired to secure by Letters Patent of the United States is:

1. A terminal assembling tool for facilitating the connection of multiple terminated wires to a common bus connector, the terminated wires each including a terminal for receiving a terminal of complementary type, and the common bus connector including multiple terminals of said complementary type extending therefrom in substantially the same direction, comprising:

a first jig for receiving said multiple terminated wires;

a second jig for receiving said common bus connector;

at least one of said first and second jigs being movable relative to the other between relative proximate and distant positions respectively corresponding with a connecting position and a load/unload position;

means for actuating said one of said first and second jigs between said connecting and said load/unload positions;

said first jig including means for pre-positioning said terminated wires; and said second jig including means for pre-positioning said common bus connector, whereby upon said actuation of said one of said first and second jigs said terminated wires are accurately and completely connected to respective ones of said terminals on said common bus connector.

2. The terminal assembling tool of claim 1 wherein said jig actuating means comprises a pneumatically-powered linear actuator.

3. The terminal assembling tool of claim 2 including a base member and wherein said actuator includes a housing and a reciprocable actuating arm, said base member housing and said first jig being substantially fixedly mounted to said base member and said second jig being connected to said actuating arm of said actuator for reciprocation between said connecting and load/unload positions.

4. The terminal assembling tool of claim 1 wherein said terminals on said wires are of a female type, said common bus connectors are of a male type and said common bus connector includes a common base portion, said multiple male terminals extending forwardly from said base portion, and a pair of end fingers being disposed at opposite ends of said base portion and extending forwardly therefrom, and wherein said second jig further includes retaining means extending transversely of said common base portion end fingers and forwardly thereof to engage said end fingers and move said common base portion and connected terminated wires rearwardly in unison for unloading when said second jig is actuated from said connecting position to said load/unload position.

5. The terminal assembling tool of claim 4 wherein said second jig is disposed for actuation in the horizontal plane and said pre-positioning means thereof comprise a cavity therein open at the top and at the front of said second jig for receiving/discharging the common bus connector via vertical motion thereof and for closely orienting the common bus connector when received in the cavity.

6. The terminal assembling tool of claim 5 wherein said first jig includes multiple, substantially parallel slots in the upper surface thereof, a respective said slot existing for each of said terminated wires, said slots being substantially aligned with respective said male terminals on said common bus connector, and wherein each of said slots is contoured at its forward end to retain a respective female terminal therein in alignment with a respective said male terminal.

7. The terminal assembling tool of claim 6 wherein said male terminals are of the spade type and extend in a horizontal plane when disposed in said second jig.

* * * * *